United States Patent [19]

Phillips et al.

[11] 4,263,772
[45] Apr. 28, 1981

[54] PIVOTABLE FORAGE HARVESTER TRANSFER CHUTE

[75] Inventors: Frederick W. Phillips, Leola; Edward H. Priepke, Stevens, both of Pa.

[73] Assignee: Sperry Corporation, New Holland, Pa.

[21] Appl. No.: 129,070

[22] Filed: Mar. 10, 1980

[51] Int. Cl.³ .............................................. A01D 55/26
[52] U.S. Cl. ...................... 56/13.9; 56/13.3; 56/17.4
[58] Field of Search ...................... 56/13.3, 13.4, 13.6, 56/13.7, 13.8, 13.9, 17.4, 320.1, 320.2

[56] References Cited

U.S. PATENT DOCUMENTS

| | | | |
|---|---|---|---|
| 3,530,650 | 9/1970 | Phillips | 56/13.3 |
| 3,916,605 | 11/1975 | Richards et al. | 56/13.3 |
| 4,188,160 | 2/1980 | Corbett et al. | 56/13.3 |

*Primary Examiner*—Robert A. Hafer
*Attorney, Agent, or Firm*—Larry W. Miller; Frank A. Seemar; James R. Bell

[57] ABSTRACT

A self-propelled forage harvester having a longitudinally extending mobile frame supported by a pair of forwardly disposed transversely spaced wheels is disclosed wherein a transfer chute having a pivotally mounted frame guides crop material from the cutterhead to the discharge blower. The cutterhead is mounted on the forward portion of the mobile frame and includes a housing having a rear crop outlet opening. A shear bar is mounted adjacent the path of a plurality of knives affixed to the rotatably mounted transversely disposed cylindrical cutterhead, the knives cooperating with the shear bar to cut crop material and throw it rearwardly through the crop outlet opening. A crop discharge blower unit having a housing with a crop inlet opening aligned with the crop outlet opening of the cutterhead housing is mounted on the frame behind the cutterhead. The crop transfer chute guides crop material being thrown through the crop outlet opening by the rotating cutterhead to the crop inlet opening in the blower housing. The transfer chute includes a pivotally mounted frame which is selectively positionable between operative and inoperative position to provide a convenient access to the cutterhead and blower units.

19 Claims, 4 Drawing Figures

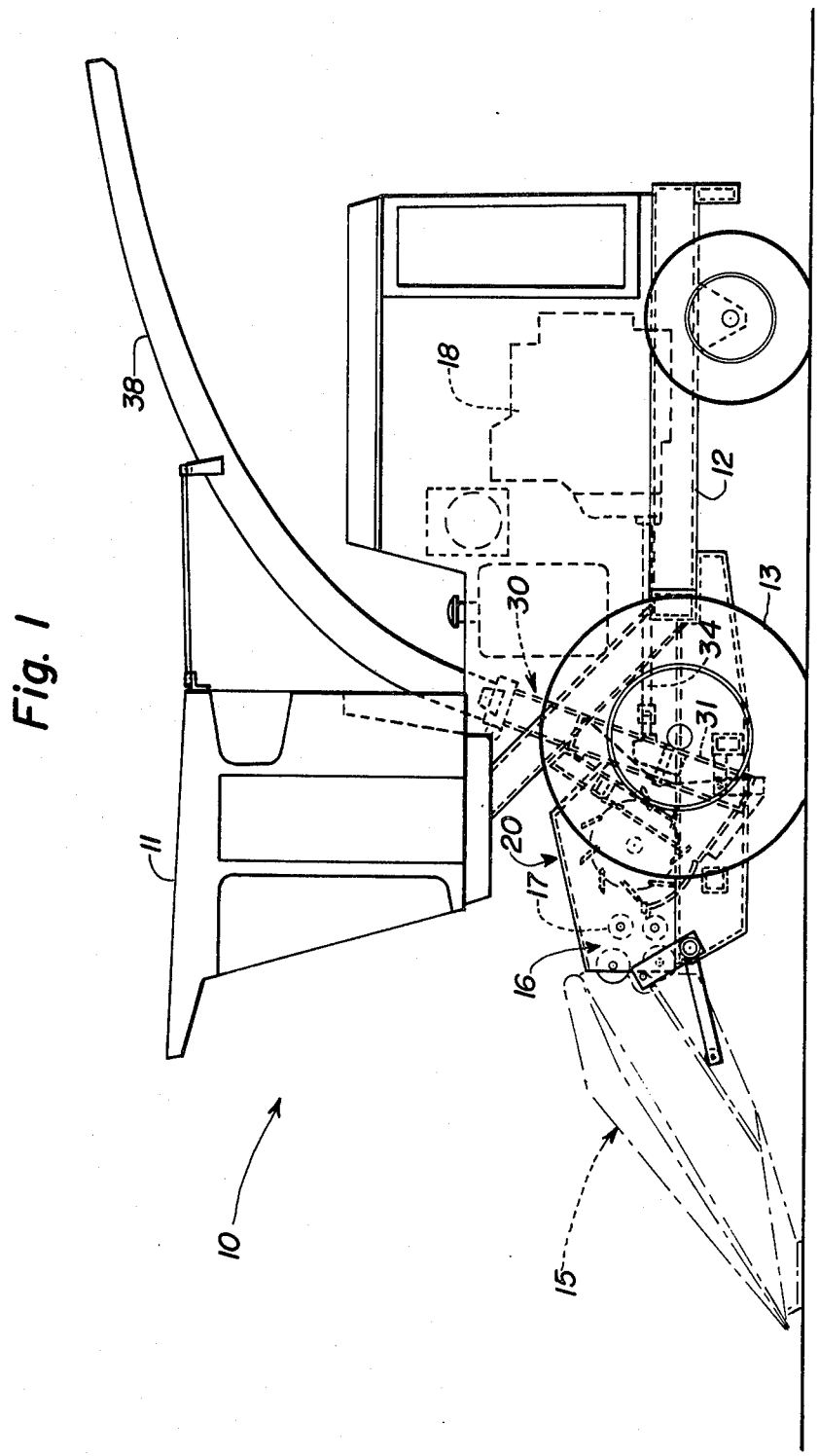

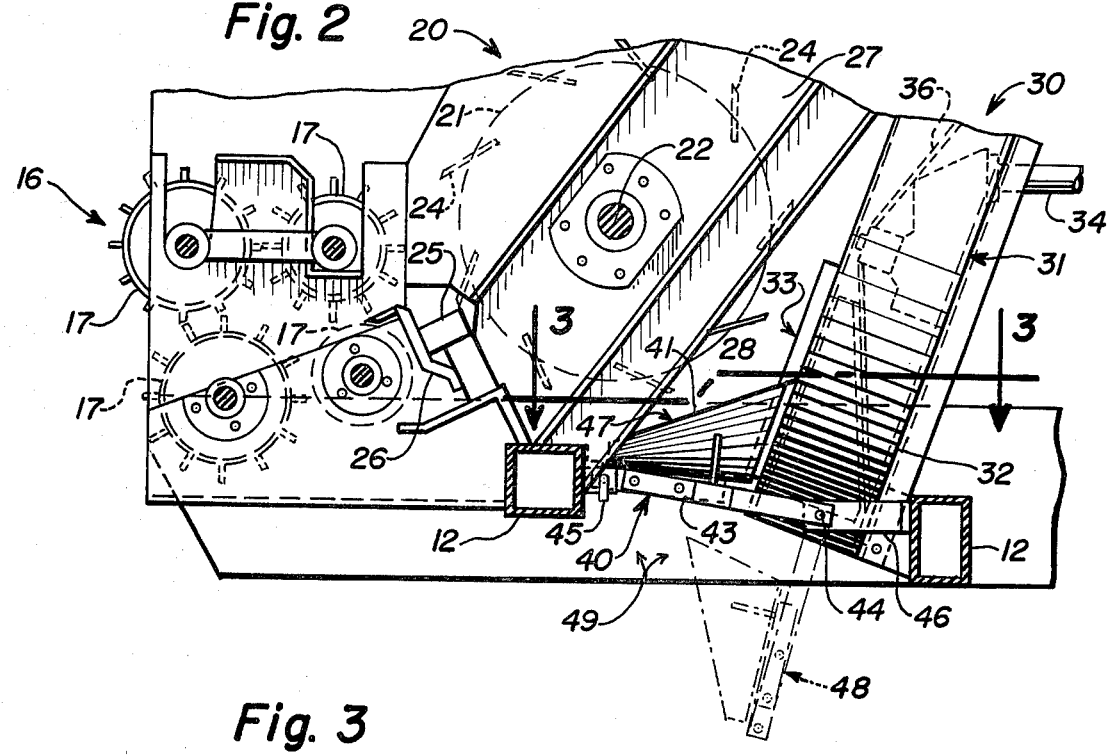
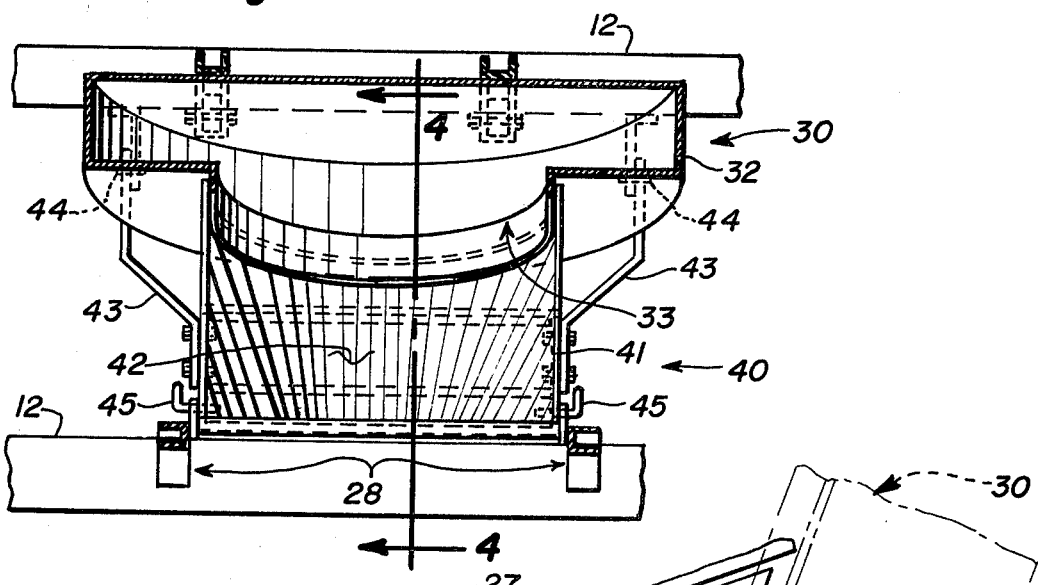
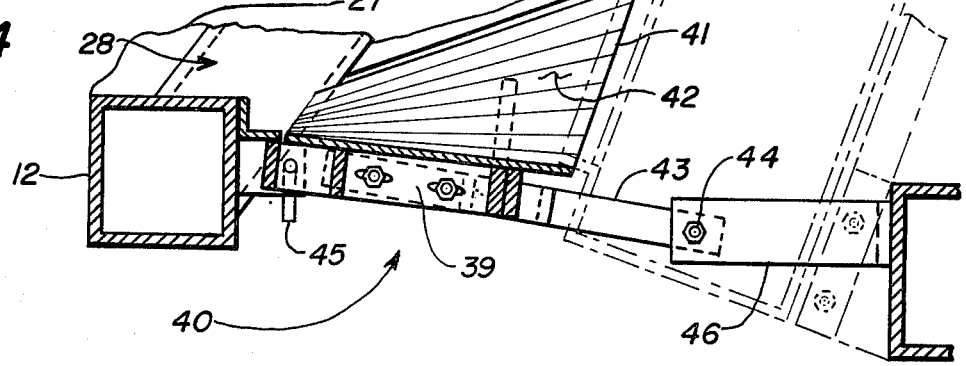

PIVOTABLE FORAGE HARVESTER TRANSFER CHUTE

BACKGROUND OF THE INVENTION

The present invention relates generally to self-propelled forage harvesters and more particularly to an improved transfer chute which guides crop material between the cutterhead and blower units.

The well known agricultural practice of forage harvesting consists of comminuting either green or mature crop material into discrete particles and conveying them from the field to a storage silo where they undergo an acid fermentation to give them an agreeable flavor and to prevent spoilage. This operation, which is commonly referred to as an ensilage process, converts standing crop in the field to livestock feed, commonly referred to as silage.

An essential piece of farm machinery used for producing silage is the forage harvester which is adapted to gather crop material from the field, cut it into small particles and then convey the comminuted crop material to a temporary storage bin or wagon. Harvesters of this type can be either self-propelled or pulled by a tractor. Typically, forage harvesters include a rotary cutting mechanism having knives disposed in a generally cylindrical configuration with cutting edges peripherally exposed to cooperate with a fixed shear bar for cutting crop material as it is being passed across the shear bar. An optional perforated recutter screen is used under some conditions to reduce the size of cut crop material to an even further smaller dimension.

Forage harvesters are commonly provided with a blower to convey the cut crop to a wagon towed to the rear of the harvester for receiving the crop. In one well known prior art arrangement, comminuted crop material is transferred to the blower from the cutterhead via an auger system comprising side-by-side augers at right angles to the axis of the rotary cutter. Problems have been encountered in some instances with this type of mechanism when material accumulates unevenly along the augers and causes clogging. From a design standpoint, augers provide extra moving parts that are subject to wear and thereby reduce overall the reliability and servicability characteristics of the harvester. Furthermore, the use of augers increases the power requirements of forage harvesters, particularly in crop material having a high moisture content.

To overcome problems of this nature, many self-propelled forage harvesters have been designed with cutterheads which discharge material directly to the blower without intermediate conveying means. In these direct discharge machines, the blower unit receives material fed from the cutterhead directly to the fan blades which, in turn, convey the cut crop material upwardly through a spout and thence to a bin or wagon. For maximum effectiveness, the cutterhead and blower units in self-propelled harvesters are mounted in close proximity. This gives rise to problems when access to the blower and rear portions of the cutterhead becomes necessary for the purpose of service, inspection, repair, etc. To this end, some prior art forage harvesters provide access by pivotally mounting the blower or cutterhead about a vertical axis to swing the units relative to each other. In other instances, various parts or assemblies must be removed to gain access to the blower and, depending on the relationship of the various parts and assemblies on the unit, lengthy disassembly and reassembly operations can be required when access becomes necessary.

SUMMARY OF THE INVENTION

Accordingly, it is a principle object of the present invention to provide an improved forage harvester having a transfer chute uniquely mounted between cutterhead and blower units in a simple, efficient and economical manner.

Another object, taking into consideration the presence on a self-propelled forage harvester of forwardly disposed transversely spaced support wheels between which the cutterhead and blower units are generally mounted, is to provide a transfer chute between such units which improves servicability in a manner not heretofore known.

A further object is to provide a pivotally mounted transfer chute which will permit access to the cutterhead and blower units without lengthy disassembly and reasssembly operations.

It is a still further object of this invention to provide a forage harvester transfer chute which is durable in construction, inexpensive of manufacture, facile in assemblage, and simple and effective in use.

In pursuance of these and other objects, the present invention contemplates a new and improved self-propelled forage harvester apparatus in which the blower unit is positioned in close communication with the cutterhead to improve the overall efficiency and effectiveness of the harvester while still permitting convenient access to the cutterhead and blower unis for service, inspection, repair and the like. It is to be expressly understood, however, that the drawings are for illustrative purposes and are not to be construed as defining the limits of the invention.

These and other objects are accomplished according to the instant invention by providing a self-propelled forage harvester having a longitudinally extending mobile frame supported by a pair of forwardly disposed transversely spaced wheels wherein a transfer chute having a pivotally mounted frame guides crop material from the cutterhead to the discharge blower. The cutterhead is mounted on the forward portion of the mobile frame and includes a housing having a rear crop outlet opening. A shear bar is mounted adjacent the path of a plurality of knives affixed to the rotatably mounted transversely disposed cylindrical cutterhead, the knives cooperating with the shear bar to cut crop material and throw it rearwardly through the crop outlet opening. A crop discharge blower unit having a housing with a crop inlet opening aligned with the crop outlet opening of the cutterhead housing is mounted on the frame behind the cutterhead. The crop transfer chute guides crop material being thrown through the crop outlet opening by the rotating cutterhead to the crop inlet opening in the blower housing. The transfer chute includes pivotally mounted frame which is selectively positionable between operative and inoperative position to provide a convenient access to the cutterhead and blower units.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a side elevational view of a self-propelled forage harvester incorporating the principles of the instant invention;

FIG. 2 is a more detailed side elevational view of a portion of the self-propelled forage harvester shown in FIG. 1, the support wheel being removed for clarity;

FIG. 3 is a partial cross sectional plan view taken along lines 3—3 of FIG. 2, this view being rotated 90° from the view as seen in FIG. 2, the blower fan being removed for clarity; and FIG. 4 is a cross sectional view taken along lines 4—4 of FIG. 3, the blower housing being shown in phantom.

DETAILED DESCRIPTION OF THE INVENTION

Referring now to the drawings and, particularly to FIG. 1, a side elevational view of a self-propelled precision type forage harvester can be seen. The forage harvester 10 includes a mobile frame 12 supported by wheels 13 and driven by a power unit 19. A crop gathering header 15 is disposed at the forward end of the forage harvester 10 for collecting the crop material, consolidating it and discharging it rearwardly through an infeed mechanism 16, including a set of infeed rolls 17, toward a cutterhead unit 20. The infeed rolls 17 generally present the crop material in a mat form across a shear bar 25 which cooperates with the knives 24 mounted on the rotating cutterhead 21 to comminute crop material by a shearing action. A cab 11 is positioned above the header 15 so that the operator may have a full view of the harvesting operation occurring below and forward of him.

A rotary crop discharge means 30 is mounted rearward of the rotating cutterhead 21 and, according to the preferred embodiment seen in FIGS. 1 through 4, is aligned in a plane tilted in an acute angle to the vertical; however, it should be realized by one skilled in the art that the instant invention should not be limited to applications where the crop discharge means is not in a vertical plane. The crop discharge means 30 is shown to be in the form of a rotary blower 31 having a generally circular housing 32 in which a plurality of crop engaging paddles 36 are rotatably mounted. The crop engaging paddles 36 engage crop material entering into the housing 32 and imparts sufficient energy thereto for discharging upwardly and rearwardly through the discharge spout 38 to a trailing temporary storage container (not shown). The drive means 34 extending from the power unit 19 operatively powers the rotary blower 31.

Referring now to FIG. 2, an enlarged side elevational view, showing the preferred relationship between the cutterhead unit 20 and the crop discharge means 30, can best be seen. The cutterhead unit 20 includes a housing 27 in which a cutterhead 21 is mounted for rotation about a generally transversely disposed axis of rotation 22. A plurality of knives 24 are mounted on the cutterhead 21 such that, upon rotation of the cutterhead 21, the knives 24 pass in close proximity to a shear bar 25. Crop material fed toward the cutterhead unit 20 by the infeed mechanism 16 passes over the shear bar 25 and is shearingly cut into relatively small particles by the knives 24. The shear bar 25 is typically stationarily mounted on the frame 12 through an adjustment mechanism 26 which permits selective movement of the shear bar 25 toward or away from the cutterhead 21 to obtain the proper shearing action.

The cutterhead housing 27 terminates in a rearwardly facing crop outlet opening 28 through which comminuted crop material is thrown by the rotating cutterhead 21 and the knives 24 mounted thereon. The comminuted crop material is then guided toward the crop discharge means 30 by a crop transfer means 40. Generally, the crop transfer means 40 includes a chute member 41 having a crop engaging surface 42 (better seen in FIGS. 3 or 4) which serves as a transition to guide crop material from a generally rectangular crop outlet opening 28 in the cutterhead housing 27 to a generally semicircular crop inlet opening 33 in the blower housing 32.

As can be seen in FIGS. 2, 3 and 4, the chute member 41 is mounted upon a subframe structure 43 which is pivotally mounted to the frame 12 by a remote pivot 44. The pivot 44 enables the chute member 41 and the subframe 43 to be swung between a closed operative position 47 and an open inoperative position 48 (shown in phantom in FIG. 2). The adjustment mechanism 39, best seen in FIG. 4, allows the chute member 41 to be moved relative to the subframe 43 so that the chute member 41 can be properly positioned relative to both the crop outlet opening 28 and the crop inlet opening 33 to maintain an efficient transfer of crop material therebetween.

It has been found that locating the pivot 44 rearward of the crop inlet opening 33 of the blower housing 32, substantially adjacent the rotary blower 31 such that the subframe 43 of the crop transfer means 40 is pivotally connected to projections 46 of the frame 12, provides for an efficient and convenient access to both the rotary blower 31 and the cutterhead 21. Access through the opening 49, created when the crop transfer means 40 is swung into the open operative position 48, is particularly convenient to service, repair or adjust the paddles 36 of the rotary blower 31, to service the rear of the cutterhead unit 20, or to remove any crop material which clogs either the cutterhead 21 or the rotary blower 31, or along the chute member 41.

The crop transfer means 40 is also provided with a locking mechanism 45, shown in the drawings as being in the form of a spring lock, which is operable to lock the chute member 41 into the closed operative position 47 so as to guide crop material from the rotating cutterhead 21 to the rotary blower 31. As is best seen in FIGS. 2 and 4, the locking means cooperates between the subframe 43 of the crop transfer means 40 and the main frame 12 to lock the crop transfer means 40 in position.

The embodiment depicted in FIGS. 1 through 4 shows the crop discharge means 30 being positioned so close to the cutterhead unit 20 that the crop inlet opening 33 and the blower housing 32 is actually positioned beneath a portion of the rotating cutterhead 21. To provide an adequate access opening 49 and, thereby, provide a convenient access to both the crop discharge means 30 and the rear of the cutterhead unit 20, it was necessary to rotate the entire crop transfer means 40 about the remote pivot 44. For other embodiments of forage harvesters, where the crop discharge means 30 is spaced more remotely from the cutterhead unit 20 and, accordingly, the crop transfer means 40 would have a more substantial size than is seen in the preferred embodiment, it may be desirable to provide a pivotable access door, according to the principles of the instant invention, which forms only a portion of the entire crop transfer means 40.

In operation, gaining access to the rotary blower 31 or the rear of the cutterhead unit 20 can be accomplished merely by releasing the locking mechanism 45 and allowing the crop transfer means 40 to rotate downwardly about the remotely positioned pivot 44. The operator may then inspect both the cutterhead 21 and the rotary blower 31 as well as make repairs, adjustments or service to either unit. Because the crop transfer means 40 remains intact with the forage harvester 10 at its pivot connection 44 with the frame 12, the operator may quickly and efficiently resume operation merely by rotating the crop transfer means 40 back upwardly into its closed operative position 47 and locking it by manipulation of the locking mechanism 45.

It will be understood that there is changes in the details, materials, steps and arrangement of parts which have been described and illustrated to explain the nature of the invention, will occur to and may be made by those skilled in the art upon a reading of the disclosure within the principles and scope of the invention. The foregoing description illustrates perferred embodiments of the invention. However, concepts, as based upon such description, may be employed in other embodiments without departing from the scope of the invention. Accordingly, the following claims are intended to protect the invention broadly as well as in the specific form shown herein.

Having thus described the invention, what is claimed is:

1. In a forage harvester having a main frame adapted for movement across a field; a generally cylindrical cutterhead supported by said main frame, said cutterhead including a plurality of knives mounted thereon for cooperating with a shear bar mounted in close proximity to said cutterhead to comminute crop material fed therebetween, said cutterhead being operable to convey comminuted crop material rearwardly therefrom; a discharge means spaced from said cutterhead and supported by said main frame for the discharge of comminuted crop material away from said forage harvester; a crop transfer means extending from said cutterhead to said discharge means to guide the movement of comminuted crop material from said cutterhead to said discharge means; and drive means for powering said cutterhead and said discharge means, an improved crop transfer means comprising:
    a subframe pivotally connected to said main frame for selective rotation of said crop transfer means relative to said frame to provide access to said cutterhead and said discharge means without completely removing said transfer means from said forage harvester; and
    locking means spaced from said subframe pivot for selectively locking said transfer means into an operating position relative to said cutterhead to guide comminuted crop material toward said discharge means.

2. The forage harvester of claim 1 wherein said crop transfer means further includes a chute member for guiding comminuted crop material toward said crop discharge means.

3. The forage harvester of claim 2 wherin said discharge means includes a rotatable blower having a plurality of rotating discharge paddles to engage comminuted crop material entering said blower and discharge same away from said forage harvester.

4. The forage harvester of claim 3 wherein said blower is inclined at an acute angle to vertical and positioned in close proximity rearwardly of said cutterhead.

5. The forage harvester of claim 3 wherein said blower is positioned rearwardly of and proximate to said cutterhead, said pivotal connection between said subframe and said main frame being remotely spaced from said chute member so as to provide sufficient clearance to gain access to said cutterhead and said blower.

6. The forage harvester of claim 5 wherein said locking means includes a spring lock mechanism for latching said crop transfer means in an operating position so that said chute member guides comminuted crop material towards said discharge means.

7. The forage harvester of claim 6 wherein said chute member is adjustably mounted on said subframe for movement relative thereto.

8. A forage harvester for comminuting crop material comprising:
    a main frame adapted for movement across a field in a forward direction;
    a cutterhead rotatably mounted on said main frame, said cutterhead including a plurality of knives mounted thereon and a housing having a rear crop outlet opening;
    a shear bar supported by said main frame proximate to said cutterhead, said knives cooperating with said shear bar to comminute crop material entering therebetween and to throw said comminuted crop material through said rear crop outlet opening in said cutterhead housing;
    a crop discharge means mounted on said main frame rearward of said cutterhead for discharging comminuted crop material away from said forage harvester, said crop discharge means having a housing including a crop opening therein;
    a transfer chute interconnecting said crop outlet opening in said cutterhead housing and said crop inlet opening in said discharge means housing to guide comminuted crop material thrown through said crop outlet opening to said crop inlet opening, said transfer chute being mounted on a subframe pivotally affixed to said main frame for rotation of said transfer chute relative to said main frame to provide access to said cutterhead and said discharge means without completely removing said transfer chute from said forage harvester, said transfer chute being selectively positionable between an operating position in which said transfer chute guides crop material toward said discharge means and an inoperative position to provide access to said cutterhead and said discharge means by rotating said subframe about said pivot connection; and
    a locking means for selectively locking said transfer chute in said operating position.

9. The forage harvester of claim 8 wherein said discharge means includes a rotatable blower having a plurality of rotating discharge paddles which engage comminuted crop material entering said blower and imparting sufficient energy thereto that said comminuted crop material is discharged away from said forage harvester.

10. The forage harvester of claim 9 wherein said transfer chute acts as a transition member to guide crop material from a substantially rectangularly crop outlet opening in said cutterhead housing to a substantially semicircular crop inlet opening in said discharge means housing.

11. The forage harvester of claim 10 wherein said pivot connection between said subframe and said main frame is spaced rearwardly from said transfer chute.

12. In a forage harvester for comminuting crop material having a frame adapted for movement across a field in a forward direction; a generally cylindrical cutterhead rotatably mounted on said frame substantially transverse to said forward direction of travel, said cutterhead including a plurality of knives mounted thereon; a shear bar generally stationarily supported by said frame forward of and in close proximity to said cutterhead, said knives cooperating with said shear bar to comminute crop material passing therebetween by a shearing action, said knives further cooperating with said cutterhead to convey comminuted crop material rearwardly away from said cutterhead; a crop discharge means supported by said frame rearward of said cutterhead for discharging comminuted crop material away from said forage harvester; a crop transfer chute extending between said cutterhead and said crop discharge means to guide comminuted crop material conveyed rearwardly by said cutterhead to said crop discharge means, said crop transfer chute having a lower floor surface inclined downwardly from said cutterhead towards said crop discharge means; and drive means for driving said cutterhed and said crop discharge means, the improvement comprising:
  an access door pivotally mounted to said frame for selective rotation relative thereto, said access door forming at least a portion of said lower floor surface of said crop discharge chute, said access door being selectively positionable between a closed operative position to guide comminuted crop material rearwardly toward said crop discharge means and an open inoperative position to provide access to said cutterhead and said discharge means, said access door including a locking means to selectively lock said access door in said operating position.

13. The forage harvester of claim 12 wherein said cutterhead further includes a housing having a substantially rectangularly shaped rear crop outlet opening through which said cutterhead conveys comminuted crop material, said crop discharge means including a housing having a substantially semicircular crop inlet opening, said transfer chute operating as a transition to guide comminuted crop material conveyed rearwardly by said cutterhead through said substantially rectangular crop outlet opening to said substantially semicircular crop inlet opening.

14. The forage harvester of claim 13 wherein said discharge means includes a rotatable blower having a plurality of rotating discharge paddles which engage comminuted crop material entering said blower and imparts sufficient energy thereto for discharging away from said forage harvester.

15. A self-propelled forage harvester comprising in combination:
  a longitudinally extending main frame supported at its forward end by a pair of transversely spaced wheels;
  a cutterhead unit mounted between said wheels on the forward end of said main frame, said cutterhead unit including a housing having a rear crop outlet opening, a share bar mounted within said housing, a transverse generally cylindrical cutterhead and means rotatably mounting said cutterhead adjacent said shear bar in cooperative relationship for cutting crop metarial;
  a feeder mechanism for feeding crop material to said cutterhead unit;
  a blower unit mounted on said main frame rearwardly of said cutterhead unit and including a housing, a fan rotatably mounted within said housing for rotation about a generally longitudinal axis for blowing cut crop material upwardly, said blower unit having a crop inlet opening spaced from said rear crop outlet opening of said cutterhead unit;
  a crop transfer chute interconnecting said crop outlet opening and said crop inlet opening to guide crop material therebetween, said crop transfer chute being mounted on a subframe pivotally connected to said main frame for rotation of said transfer chute relative to said main frame, said crop transfer chute being selectively pivotally positionable between a closed operating position to guide crop material between said crop outlet opening and crop inlet opening and an open inoperative position to provide access to said cutterhead unit and said blower unit;
  locking means for selectively locking said transfer chute in said operating position; and
  a power unit mounted on said frame comprising an engine with output means for driving said cutterhead and said blower whereby cut material is conveyed from said cutterhead to said blower via said crop outlet opening, said crop transfer chute and said crop inlet opening and thence upwardly by operation of said blower.

16. The forage harvester of claim 15 wherein said crop transfer chute is adjustable mounted on said subframe for movement relative thereto.

17. The forage harvester of claim 16 wherein said discharge means is positioned rearwardly of and proximate to said cutterhead unit, said crop inlet opening being in substantial alignment with said crop outlet opening.

18. The forage harvester of claim 17 wherein the longitudinal axis for said blower unit fan is inclined forwardly and upwardly.

19. The forage harvester of claim 18 wherein said locking means includes a spring lock mechanism for locking said crop transfer chute in said operating position.

* * * * *